US 12,304,083 B2

United States Patent
Zheng et al.

(10) Patent No.: US 12,304,083 B2
(45) Date of Patent: May 20, 2025

(54) LEGGED ROBOT MOTION CONTROL METHOD, APPARATUS, AND DEVICE, AND MEDIUM

(71) Applicant: TENCENT TECHNOLOGY (SHENZHEN) COMPANY LIMITED, Shenzhen (CN)

(72) Inventors: Yu Zheng, Shenzhen (CN); Xinyang Jiang, Shenzhen (CN); Wanchao Chi, Shenzhen (CN); Zhengyou Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 404 days.

(21) Appl. No.: 17/969,999

(22) Filed: Oct. 20, 2022

(65) Prior Publication Data

US 2023/0055206 A1    Feb. 23, 2023

Related U.S. Application Data

(63) Continuation of application No. PCT/CN2021/102721, filed on Jun. 28, 2021.

(30) Foreign Application Priority Data

Sep. 7, 2020   (CN) .......................... 202010927326.4

(51) Int. Cl.
    *B62D 57/032*    (2006.01)
    *B25J 9/16*      (2006.01)

(52) U.S. Cl.
    CPC .......... *B25J 9/1664* (2013.01); *B62D 57/032* (2013.01)

(58) Field of Classification Search
    None
    See application file for complete search history.

(56) References Cited

U.S. PATENT DOCUMENTS

| | | | |
|---|---|---|---|
| 10,081,104 B1 | 9/2018 | Swilling | |
| 2013/0144441 A1* | 6/2013 | Kanazawa | B25J 9/1607 700/263 |

(Continued)

FOREIGN PATENT DOCUMENTS

| | | |
|---|---|---|
| CN | 103092196 B | 3/2016 |
| CN | 104570732 B | 2/2017 |

(Continued)

OTHER PUBLICATIONS

Abhijit Mahapatra, Multi-body Dynamic Modeling of Multi-legged Robots, Springer (Year: 2020).*

(Continued)

*Primary Examiner* — Kyle T Johnson
*Assistant Examiner* — Arslan Azhar
(74) *Attorney, Agent, or Firm* — ANOVA LAW GROUP PLLC

(57) ABSTRACT

A legged robot motion control method includes: acquiring centroid state data of a spatial path start point and a spatial path end point of a motion path; determining a target landing point of afoot of the legged robot in the motion path based on the spatial path start point and the spatial path end point; determining a change relationship between a centroid position change coefficient and a foot contact force based on the centroid state data; selecting, under constraint of a constraint condition set, a target centroid position change coefficient that meets the change relationship; the constraint condition set including a spatial landing point constraint condition; determining a target motion control parameter according to the target centroid position change coefficient and the target landing point of the foot; and controlling, based on the target (Continued)

motion control parameter, the legged robot to perform motion according to the motion path.

20 Claims, 7 Drawing Sheets

(56) References Cited

U.S. PATENT DOCUMENTS

| | | | |
|---|---|---|---|
| 2018/0004208 A1 | 1/2018 | Su | |
| 2019/0070729 A1* | 3/2019 | Kamioka | B62D 57/032 |
| 2019/0204848 A1* | 7/2019 | Xiong | G05D 1/0268 |
| 2020/0209890 A1* | 7/2020 | Xiong | G05D 1/0891 |

FOREIGN PATENT DOCUMENTS

| | | |
|---|---|---|
| CN | 106826813 A | 6/2017 |
| CN | 107562052 A | 1/2018 |
| CN | 107644441 A | 1/2018 |
| CN | 108333931 A | 7/2018 |
| CN | 108772836 A | 11/2018 |
| CN | 108931988 A | 12/2018 |
| CN | 108983804 A | 12/2018 |
| CN | 110209048 A | 9/2019 |
| CN | 110597267 A | 12/2019 |
| CN | 110764415 A | 2/2020 |
| CN | 111230867 A | 6/2020 |
| CN | 111506094 A | 8/2020 |
| CN | 112051797 A | 12/2020 |
| CN | 112114589 A | 12/2020 |
| IN | 107065867 B | 5/2019 |

OTHER PUBLICATIONS

The World Intellectual Property Organization (WIPO) International Search Report for PCT/CN2021/102721 Sep. 22, 2021 7 Pages (including translation).

Wieber P B, "Holonomy and nonholonomy in the dynamics of articulated motion, Fast motions in biomechanics and robotics". 2006, p. 411-425. Springer, Berlin, Heidelberg.

The European Patent Office (EPO) The Extended European Search Report for 21863334.5, Sep. 18, 2023 9 Pages.

Buchli Jet al:"Compliant quadruped locomotion over rough terrain", Intelligent Robots and Systems 2009. IROS 2009. IEEE/RSJ International Conference on IEEE Piscataway NJ, USA, Oct. 10, 2009, pp. 814-882.

China National Intellectual Property Administration (CNIPA) Office Action 1 for 202010927326.4, Oct. 11, 2023 14 Pages (including translation).

* cited by examiner

LEGGED ROBOT MOTION CONTROL METHOD, APPARATUS, AND DEVICE, AND MEDIUM

CROSS-REFERENCES TO RELATED APPLICATIONS

This application is a continuation application of PCT Patent Application No. PCT/CN2021/102721, entitled "METHOD, APPARATUS AND DEVICE FOR CONTROLLING MOVEMENT OF LEGGED ROBOT, AND MEDIUM" and filed on Jun. 28, 2021, which claims priority to Chinese Patent Application No. 2020109273264, entitled "LEGGED ROBOT MOTION CONTROL METHOD, APPARATUS, AND DEVICE, AND MEDIUM" and filed with the China National Intellectual Property Administration on Sep. 7, 2020, the entire contents of both of which are incorporated herein by reference.

FIELD OF THE TECHNOLOGY

The present disclosure relates to the field of robot technologies, and in particular, to a legged robot motion control technology.

BACKGROUND OF THE DISCLOSURE

With continuous development of computer technologies, various robots gradually appear including legged robots. How to control motion of a robot is an always-focused problem in the robot field. For a legged robot, before motion of the legged robot is controlled, a centroid motion track of the legged robot generally needs to be determined, so as to control the legged robot according to the centroid motion track.

In a related art, generally, a centroid position of a robot is obtained by using a motion equation of a legged robot, and a centroid motion track is further determined. However, the centroid motion track obtained by using the motion equation of the legged robot is not highly in accordance with a real motion environment of the legged robot, and therefore, it is difficult for the legged robot to complete motion under control of the centroid motion track, that is, the centroid position generated in the related art has poor adaptability to the real environment.

SUMMARY

Embodiments of the present disclosure provide a legged robot motion control method, apparatus, and device, and a medium, so as to improve adaptability of a generated centroid position to a real environment.

According to one aspect, an embodiment of the present disclosure provides a legged robot motion control method, performed by a control device and including: acquiring centroid state data respectively corresponding to a spatial path start point and a spatial path end point of a motion path of a legged robot; determining a target landing point of a foot of the legged robot in the motion path based on the spatial path start point and the spatial path end point; determining a change relationship between a centroid position change coefficient and a foot contact force based on the centroid state data respectively corresponding to the spatial path start point and the spatial path end point; selecting, under constraint of a constraint condition set, a target centroid position change coefficient that meets the change relationship, where the constraint condition set comprises at least a spatial landing point constraint condition, and the spatial landing point constraint condition constrains a value of the centroid position change coefficient for the legged robot to reach the target landing point; determining a target motion control parameter according to the target centroid position change coefficient and the target landing point of the foot; and controlling, based on the target motion control parameter, the legged robot to perform motion according to the motion path.

According to still another aspect, an embodiment of the present disclosure provides a legged robot motion control device, including: a memory; and at least one processor connected to the memory; the memory storing instructions executable by the at least one processor, and the at least one processor implementing: acquiring centroid state data respectively corresponding to a spatial path start point and a spatial path end point of a motion path of a legged robot; determining a target landing point of a foot of the legged robot in the motion path based on the spatial path start point and the spatial path end point; determining a change relationship between a centroid position change coefficient and a foot contact force based on the centroid state data respectively corresponding to the spatial path start point and the spatial path end point; selecting, under constraint of a constraint condition set, a target centroid position change coefficient that meets the change relationship, where the constraint condition set comprises at least a spatial landing point constraint condition, and the spatial landing point constraint condition constrains a value of the centroid position change coefficient for the legged robot to reach the target landing point; determining a target motion control parameter according to the target centroid position change coefficient and the target landing point of the foot; and controlling, based on the target motion control parameter, the legged robot to perform motion according to the motion path.

According to still another aspect, an embodiment of the present disclosure provides a non-transitory storage medium, storing computer instructions, when run on a computer, causing the computer to perform the method according to the one aspect.

Because the foregoing technical solutions are used in the embodiments of the present disclosure, at least the following technical effects are obtained:

In the embodiments of the present disclosure, a change relationship between a foot contact force of a legged robot and a centroid position change coefficient is determined according to centroid state data of a spatial path start point and centroid state data of a spatial path end point of the legged robot, and a centroid position change coefficient of the legged robot is determined according to the change relationship and a constraint condition set, so as to determine a centroid position of the legged robot at each moment. Because the constraint condition set includes a spatial landing point constraint condition, the determined centroid position is always accessible to the legged robot, so that a determined centroid motion track of the legged robot matches an actual motion process of the legged robot, and adaptability of the determined centroid position to an actual motion environment is improved. In addition, in the embodiments of the present disclosure, the centroid motion track of the legged robot can be automatically generated, and motion of the legged robot along a specified target landing point can be controlled, thereby improving intelligence of the legged robot.

DESCRIPTION OF EMBODIMENTS

Figure 1:
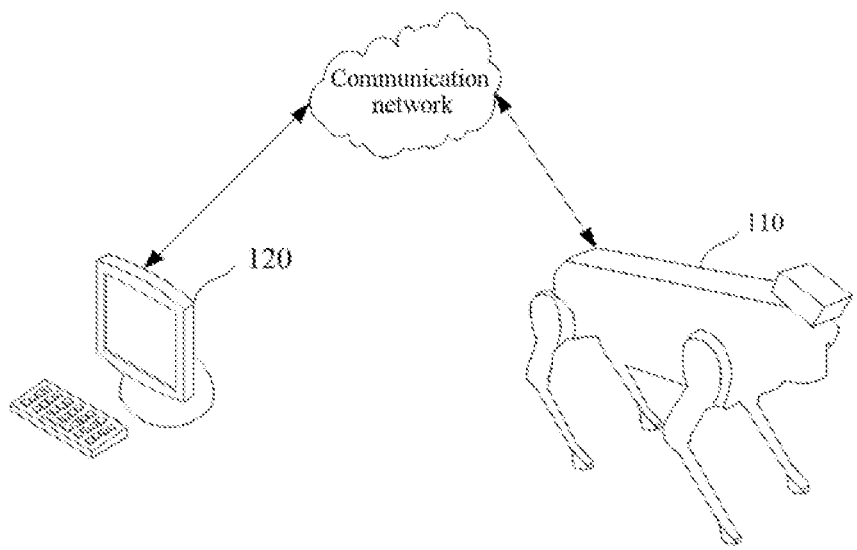
FIG. 1 is an example diagram of an application scenario of a legged robot motion control method according to an embodiment of the present disclosure.

To better understand the technical solutions provided in the embodiments of the present disclosure, the following describes in detail with reference to the accompanying drawings of the specification and specific implementations.

To facilitate a person skilled in the art to better understand the technical solutions of the present disclosure, the following describes nouns involved in the present disclosure.

Robot: is a machine (such as a robot dog or a robot cat) that mimics human behavior or ideologically simulates other organisms. In a broad sense, some computer programs are also referred to as robots. In the contemporary industry, a robot refers to an artificial robot that can automatically execute a task, and is used for replacing or assisting a human to work, and may be an electromechanical apparatus, or is controlled by a computer program or an electronic circuit.

Legged robot: generally refers to a robot having a foot. The legged robot may be configured with one or more feet, for example, two feet, four feet, or six feet. Each foot is correspondingly configured with one or more joints.

Motion path: refers to a motion path that needs to be completed by a legged robot, and a length of the motion path may be any, which is not specifically limited. Moving duration required by the legged robot to complete the motion path is considered as a sampling period. The moving duration includes a plurality of moments. When a centroid position is actually determined, a sampling moment may be selected from the plurality of moments included in the moving duration.

Spatial path start point: may also be referred to as a start position, and refers to a position at which a robot starts to move along a motion path. A moment corresponding to the spatial path start point may also be referred to as a start moment.

Spatial path end point: may also be referred to as an end position, and refers to a position at which a robot stops moving along a motion path. A moment corresponding to the spatial path end point may also be referred to as an end moment.

Centroid state data: refers to data used for describing a change of a centroid state of a robot and may specifically include one or more of a centroid position, a centroid speed, or a centroid acceleration of the robot. The centroid position is a central position of mass of the robot, and is used for describing a position of the robot. In different motion states, the centroid position of the robot changes. The centroid speed may be obtained by performing first-order derivation on a time interval by using a centroid position change, and the centroid acceleration may be obtained by performing second-order derivation on the time interval by the centroid position change. For ease of description, the centroid position of the spatial path start point may be referred to as a start centroid position, the centroid speed of the spatial path start point may be referred to as a start centroid speed, and the centroid acceleration of the spatial path start point may be referred to as a start centroid acceleration. Likewise, the centroid position of the spatial path end point may be referred to as an end centroid position, the centroid speed of the spatial path end point may be referred to as an end centroid speed, and the centroid acceleration of the spatial path end point may be referred to as an end centroid acceleration.

Target landing point: may also be referred to as a landing point or a foothold, and refers to a position in which a foot of a robot contacts a contact surface when the foot of the robot contacts the contact surface. For example, at a moment, a first foot of the robot is in contact with the contact surface, and a landing point corresponding to the first foot of the robot is point A.

Centroid position change coefficient: is a parameter used for describing a centroid position change as time changes. The centroid position change coefficient is represented in a matrix form, or is represented in a vector form, or the like. The centroid position change coefficient and a time interval can jointly represent a centroid position at a specific moment. The time interval refers to a time difference between the specific moment and a moment corresponding to the spatial path start point.

Contact surface: refers to a surface on which a foot of a robot contacts an environment, for example, a ground or another support that contacts the foot. Because of an unequal road surface condition, contact surfaces corresponding to a plurality of feet of a legged robot may be different.

Centroid motion track: is used for describing centroid positions of a robot at different moments, and actually includes the centroid positions of the robot at different moments.

Contact point: may also be referred to as a foot for landing, and refers to a foot on a robot that is in contact with a contact surface, and a quantity of feet that are in contact with the contact surface is a quantity of contact points. Certainly, the feet of the robot that are in contact with the contact surface at different moments are not completely the same.

Stepping sequence: is used for describing a gait state of a robot in a process of completing a motion path, and specifically includes at least one motion stage in a process of the robot motioning along the motion path, and duration of each motion stage.

Foot contact force: refers to a contact force between a foot of a robot in contact with a contact surface and the contact surface.

Constraint condition set: includes one or more constraint conditions, where the constraint condition is a relational expression used for constraining a value of a centroid position change coefficient. The constraint condition set in the embodiments of the present disclosure includes at least a spatial landing point constraint condition, and the spatial landing point constraint condition is used for constraining the centroid position change coefficient, so that a robot can reach a target landing point. The spatial landing point constraint condition is specifically related to a centroid position change coefficient of the robot.

Target motion control parameter: is a parameter required for controlling motion of a legged robot and specifically includes an angle of a joint of the legged robot at any moment, a torque of a joint at any moment, and the like.

In addition, "a plurality of" in the embodiments of the present disclosure refers to two or more, "at least one" refers to one or more, and "A and/or B" specifically includes three cases: A, B, and A and B.

The following describes a design idea of the embodiments of the present disclosure.

To improve adaptability of a generated centroid position to an actual environment, the embodiments of the present disclosure provide a legged robot motion control method. In this method, a target landing point corresponding to a foot of each landing of a legged robot is first determined, a change relationship between a centroid position change coefficient and a foot contact force is determined according to centroid state data of a spatial path start point and centroid state data of a spatial path end point of the legged robot on a motion path, and based on a plurality of candidate landing points, a target centroid position change coefficient of the legged robot is determined by using the change relationship and a constraint condition set, and further, a target motion control parameter is determined according to the target centroid position change coefficient and the target landing point, and the target motion control parameter is used for controlling the legged robot to move along the motion path.

In the embodiments of the present disclosure, the constraint condition set is used for considering a workspace of a landing point of the legged robot, so that when the legged robot is controlled based on the determined centroid position, the legged robot can reach the target landing point, thereby improving adaptability of the determined centroid position to an actual motion environment. In addition, the method implements automatic generation of the centroid position or even the centroid motion track of the legged robot, and enables the legged robot to move along the selected target landing point, thereby improving automation of the legged robot. Further, in the embodiments of the present disclosure, quadratic programming may be constructed according to the change relationship, the constraint condition set, and an objective function, and the target centroid position change coefficient is determined by solving the quadratic programming. If there is a solution to the quadratic programming problem, a global optimal solution can be obtained. Therefore, the target centroid position change coefficient is converted into a quadratic programming problem, so that the optimal target centroid position change coefficient can be obtained.

Based on the foregoing design idea, the following describes an application scenario of a legged robot motion control method in an embodiment of the present disclosure.

Referring to FIG. 1, FIG. 1 is an application scenario diagram of a legged robot motion control method, or may be understood as an architecture diagram of a legged robot motion control system. The architecture includes a legged robot 110 and a control device 120. The following describes an interaction process between the control device 120 and the legged robot 110 by using an example.

In one embodiment, the control device 120 and the legged robot 110 may be two relatively independent devices:

In this case, wired or wireless communication may be performed between the legged robot 110 and the control device 120. In FIG. 1, communication between the legged robot 110 and the control device 120 is implemented by using a communications network as an example.

Before the legged robot 110 is controlled to move, the control device 120 may set centroid state data of a spatial path start point and centroid state data of a spatial path end point of the legged robot 110 in the motion path according to an operation performed by a user or a task to be performed by the legged robot 110. Alternatively, the legged robot 110 may detect the centroid state data of the spatial path start point, and upload the centroid state data of the spatial path start point to the control device 120. Alternatively, the control device 120 directly collects the centroid state data of the legged robot 110 at the spatial path start point.

Further, the control device 120 collects an environment image of the legged robot 110, or receives the environment image reported by the legged robot 110, and the control device 120 determines, according to the environment image, a target landing point at which the legged robot 110 needs to land at a foot in a motion path. Certainly, there are a plurality of manners in which the control device 120 determines the target landing point. Details are described below.

The control device 120 determines a centroid motion track of the legged robot 110 according to the centroid state data of the spatial path start point and the centroid state data of the spatial path end point, and the landing point, so as to control the legged robot 110 to perform corresponding motion. The following describes content of determining the centroid motion track and the landing point.

The control device 120 may be implemented by using a server or a terminal, and the server includes but is not limited to: an independent physical server, a server cluster formed by a plurality of physical servers, or a distributed system, and may be a cloud server that provides a basic cloud computing service. The terminal may be, for example, a mobile phone, a personal computer, a smart TV, or a portable tablet computer.

In another embodiment, the control device 120 may be part of the legged robot 110:

The control device 120 may be disposed in a body of the legged robot 110, for example, the control device 120 is an internal processor in the legged robot 110.

Before the control device 120 controls the legged robot 110 to move, the control device 120 may receive a motion instruction from an upper computer, or obtain a motion instruction according to an input operation of a user, where the motion instruction may instruct the legged robot 110 to execute a task, or may indicate the spatial path start point and the spatial path end point in the motion path of the legged robot 110. The upper computer may be any device that is wiredly or wirelessly connected to the control device 120, and the upper computer may be, for example, a terminal or a server.

The control device 120 collects the centroid state data of the legged robot 110 at the spatial path start point and the centroid state data of the spatial path end point. Further, the control device 120 may determine, according to the environment image in which the legged robot 110 is currently located, a target landing point of the foot when the legged robot 110 lands. The control device 120 determines the centroid motion track of the legged robot according to the centroid state data of the spatial path start point and the centroid state data of the spatial path end point and the target landing point, so as to control the legged robot 110 to perform motion. Content of determining the centroid motion track is described below.

Figure 2:
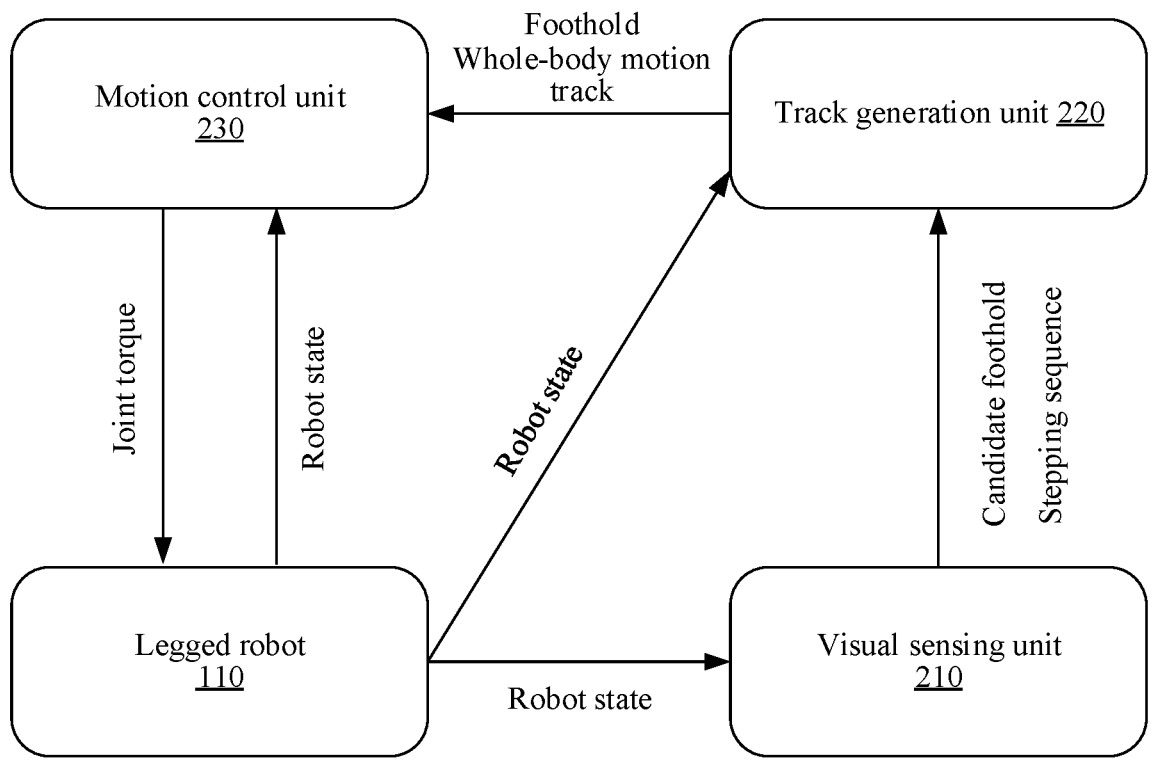
FIG. 2 is an example diagram of a structure of a control device according to an embodiment of the present disclosure.

To describe a structure of the control device 120 more clearly, the following provides an example with reference to a legged robot motion control system shown in FIG. 2. In FIG. 2, that the control device 120 includes a visual sensing unit 210, a track generation unit 220, and a motion control unit 230 is used as an example.

The visual sensing unit 210 may be disposed on the legged robot 110, for example, mounted on the head of the legged robot 110. The visual sensing unit 210 may be, for example, one or more of a camera and an infrared camera. The camera is, for example, an RGBD camera.

The visual sensing unit 210 may collect a robot state. The robot state includes the centroid state data of the spatial path start point of the legged robot 110 and the centroid state data of the spatial path end point of the legged robot 110. The visual sensing unit 210 may further collect the environment image in which the legged robot 110 is located, obtain a target landing point of each landing of the legged robot 110 according to the environment image, and obtain a stepping sequence of the legged robot 110 according to the motion path of the legged robot 110.

After the centroid state data, the environment image, and the stepping sequence are obtained, the visual sensing unit 210 may send the data to the track generation unit 220. The track generation unit 220 receives and determines centroid positions of the legged robot 110 at a plurality of moments according to the state data of the robot, the stepping sequence, and the target landing point, so as to obtain the centroid motion track of the legged robot 110, further determine a whole-body motion track of the legged robot 110, and send the whole-body motion track to the motion control unit 230.

The motion control unit 230 may determine a joint torque of each joint on the legged robot 110 according to the whole-body motion track and a target landing point, and control each joint of the legged robot 110 to rotate according to the joint torque, so as to implement motion of the legged robot 110.

Further, the motion control unit 230 may further monitor the state of the legged robot in real time in a process of the legged robot 110 moving, so as to ensure that the legged robot 110 can move stably.

Based on the foregoing application scenario, the following describes a general idea of the motion control method provided in the embodiment of the present disclosure.

In this embodiment of the present disclosure, a target landing point is pre-selected, and a centroid position of the legged robot 110 at each moment is converted into a relationship among a centroid position change coefficient, a start centroid position, and a time interval between the moment and a moment corresponding to the start centroid position. According to the centroid state data, a relationship between a centroid position and a foot contact force is converted into a change relationship between a centroid position change coefficient and a foot contact force, and the centroid position change coefficient is obtained based on the change relationship and a constraint condition set, so as to obtain the centroid motion track of the legged robot 110 according to the centroid position change coefficient, determine a target motion control parameter of the legged robot 110 according to the centroid motion track and the target landing point, and control motion of the legged robot 110 by using the target motion control parameter.

Further, when the centroid position change coefficient is determined, the problem of determining the centroid position change coefficient may be converted into a mixed integer quadratic programming problem with reference to the constraint condition set and the change relationship, so as to obtain the centroid position by solving the quadratic programming problem. The change relationship and the constraint condition set are preconfigured by the control device 120, acquired by the control device 120 from another device or a network resource, or created by the control device 120. The following provides an example of a manner in which the control device 120 creates the change relationship and the constraint condition set.

I. Obtain the Change Relationship:

The control device 120 may obtain, from a network resource or another device, a relational expression between a centroid position at each moment and a foot contact force at a corresponding moment. For a meaning of the foot contact force, refer to the foregoing description. Details are not described herein again. The centroid position at each moment in the relational expression is represented by using the start centroid position, the centroid position change coefficient, and a time interval, so that the relational expression between a centroid position at each moment and a foot contact force at a corresponding moment is converted into a change relationship between the centroid position change coefficient and the foot contact force. The change relationship is used for indicating the change relationship between the centroid position change coefficient and the foot contact force. After the change relationship is obtained, the control device 120 may store the change relationship in any form, such as a function form, a description statement form, or the like. The following describes a process of creating the change relationship by the control device 120 by using a specific example.

1: Obtain a first relational expression of the legged robot 110.

The first relational expression is a centroid dynamics equation of the legged robot 110, and is used for representing a relationship between a motion state of the legged robot 110 and an external force received. The first relational expression may have a plurality of expressions, such as the Newton-Euler equation. An example of the first relational expression is as follows:

$$\begin{bmatrix} m(\ddot{p}_G - g) \\ \dot{L} \end{bmatrix} = \sum_{i=1}^{N_c} \begin{bmatrix} I_{3\times3} \\ \hat{r}_i - \widehat{p_G} \end{bmatrix} f_i \quad (1)$$

m is total mass of the legged robot 110, $g \in R^3$ is a gravity acceleration, $p_G \in R^3$ is the centroid position of the legged robot 110, $\hat{r}_i \in R^3$ is a position of the legged robot 110 and an ith contact point of the contact surface, or may be referred to as a target landing point, that is, indicates a position of a foot in contact with the contact surface, $L \in R^3$ is a centroid angular momentum of the legged robot 110, $\dot{L}$ indicates that the angular momentum is used for performing first-order derivation on a time interval, $f_i \in R^3$ is a foot contact force of the ith contact point, $N_c$ is a quantity of target landing points, $\widehat{(\ )}$ operation is a diagonal matrix of ( ), and $\ddot{p}_G$ indicates second-order derivation on the time interval by $p_G$. $R^3$ represents a vector represented by three coordinate values.

When no specific description is provided, all quantities in this embodiment of the present disclosure are represented by results in a world coordinate system. For example, each variable in the foregoing formula (1) is a representation result in the world coordinate system.

Further, the first three rows in the formula (1) are obtained according to Newton's law, and the last three rows are obtained according to the Euler equation. Newton's law and Euler's equation together describe the relationship between the motion of the robot and the external force received.

Further, it can be learned from the first three rows of the formula (1): $m(\ddot{p}_G - g) = \sum_{i=1}^{N_c} f_i$, which is substituted into the last three rows of formula (1) to obtain the following formula:

$$\begin{bmatrix} m(\ddot{p}_G - g) \\ m\widehat{p_G}(\ddot{p}_G - g) + \dot{L} \end{bmatrix} = \sum_{i=1}^{N_c} \begin{bmatrix} I_{3\times 3} \\ \hat{r}_i \end{bmatrix} f_i = Gf \quad (2)$$

where, $$G = \begin{bmatrix} I_{3\times 3} & I_{3\times 3} & \cdots & I_{3\times 3} \\ \hat{r}_1 & \hat{r}_2 & \cdots & \hat{r}_{N_c} \end{bmatrix} \in R^{6 \times 3N_c}, f = \begin{bmatrix} f_1 \\ f_2 \\ \vdots \\ f_n \end{bmatrix} \in R^{N_c} \quad (3)$$

2: The centroid position at each moment in the first relational expression is represented as a sum of the start centroid position and a centroid position change amount within the time interval t, to obtain a second relational expression.

That the centroid position is represented as the sum of the centroid position of the start position and the centroid position change amount corresponding to the time interval t, which is specifically:

$$p_G = p^{init} + p_t \quad (4)$$

$p^{init}$ represents the start centroid position, and $p_t$ represents the centroid change amount corresponding to the time interval t.

The formula (4) is substituted into the formula (2), and an example of obtaining the second relational expression is as follows:

$$Gf = m \begin{bmatrix} \ddot{p}_t \\ \widehat{p^{init}} \ddot{p}_t + \hat{g} p_t \end{bmatrix} - m \begin{bmatrix} g \\ \widehat{p^{init}} g \end{bmatrix} + \begin{bmatrix} 0_{3\times 3} \\ \dot{L} \end{bmatrix} + \begin{bmatrix} 0_{3\times 1} \\ m\hat{p}_t \ddot{p}_t \end{bmatrix} \quad (5)$$

The following analyzes items in the foregoing second relational expression:

The first term m $$\begin{bmatrix} \ddot{p}_t \\ \widehat{p^{init}} \ddot{p}_t + \hat{g} p_t \end{bmatrix}$$

is in a linear relationship with $\ddot{p}_t$ and $p_t$, the second term m $$\begin{bmatrix} g \\ \widehat{p^{init}} g \end{bmatrix}$$

is a constant term, the third term $$\begin{bmatrix} 0_{3\times 3} \\ \dot{L} \end{bmatrix}$$

has $\dot{L}$, and the fourth term $$\begin{bmatrix} 0_{3\times 1} \\ m\hat{p}_t \ddot{p}_t \end{bmatrix}$$

has a product of $\hat{p}_t$ and $p_t$.

In an embodiment, when the body posture of the legged robot 110 changes slightly, $\dot{L}$ approximates to $0_{3\times 1}$, or a value of the third term $$\begin{bmatrix} 0_{3\times 3} \\ \dot{L} \end{bmatrix}$$

is determined according to a pre-specified body posture of the legged robot 110.

3: The centroid position change amount in the fourth item $\hat{p}_t \ddot{p}_t$ in the second relational expression is set to a change amount in each direction, to obtain a third relational expression:

$$\hat{p}_t \ddot{p}_t = \hat{p}_t^{xy} \ddot{p}_t^{xy} + \hat{p}_t^{xy} \ddot{p}_t^{z} + \hat{p}_t^{z} \ddot{p}_t^{xy} + \hat{p}_t^{z} \ddot{p}_t^{z} \quad (6)$$

$p_t = p_t^{xy} + p_t^{z}$, and $p_t^{xy}$ includes components of $p_t$ on x and y axes. $\ddot{p}_t^{xy}$ refers to a second-order derivative of a component of the centroid position change amount $p_t$ on a plane formed by the x and y axes to the time interval, and also represents a component of the centroid acceleration on the plane formed by the x and y axes. $\ddot{p}_t^{z}$ refers to a second-order derivative of a component of the centroid position change amount $p_t$ on a plane formed by a z axis to the time interval, and also represents a component of the centroid acceleration on the plane formed by the z axis. $\hat{p}_t^{xy}$ represents a diagonal matrix of the component of the centroid position change amount $p_t$ in the x and y axes, and $\widehat{(\ )}_t^{z}$ represents a diagonal matrix of the component of the centroid position change amount $p_t$ in the z axis.

Z coordinates of $p_t^{xy}$ are 0, $p_t^{z}$ includes a component of $p_t$ on the z axis, and x and y coordinates corresponding to $p_t^{z}$ are 0. A torque $\hat{p}_t^{xy} \ddot{p}_t^{xy}$ around the z axis is generated, and a torque in a direction in the xy plane is $\hat{p}_t^{xy} \ddot{p}_t^{z} + \hat{p}_t^{z} \ddot{p}_t^{xy}$. Because $\ddot{p}_t^{z}$ and $\hat{p}_t^{z}$ are collinear, $\hat{p}_t^{z} \ddot{p}_t^{z} = 0$.

In addition, motion of the legged robot 110 in the direction of the z axis is generally relatively stable, and $\ddot{p}_t^{z}$, $\hat{p}_t^{z}$, and $\hat{p}_t^{xy} \ddot{p}_t^{z} + \hat{p}_t^{z} \ddot{p}_t^{xy}$ may therefore be ignored. In addition, absolute values of $\hat{p}_t^{xy}$, $\ddot{p}_t^{xy}$, and $\hat{p}_t^{xy} \ddot{p}_t^{xy}$ are relatively small and may also be ignored. In an actual process of controlling the legged robot 110, a foot force between the foot and the contact surface may also be adjusted to obtain a term that is ignored in the foregoing formula (6), that is, the torque involved in the formula (6).

In an embodiment, the fifth item in the second relational expression may be ignored to obtain a third relational expression.

$$Gf \approx H_0 x_t - w \quad (7)$$

where:

$$H_0 = m \begin{bmatrix} 0_{3\times 3} & 1_{3\times 3} \\ \hat{g} & \hat{p}_{m} \end{bmatrix}, x_t = \begin{bmatrix} p_t \\ \ddot{p}_t \end{bmatrix}, \text{ and } w = \begin{bmatrix} mg \\ mp^{init}g - \dot{L} \end{bmatrix} \quad$$

$H_0$ and w are known quantities, and $x_t$ includes the centroid position change amount $p_t$ and the centroid acceleration $\ddot{p}_t$, which are to-be-determined quantities.

4: Setting the centroid position change amount to an n-order polynomial with time as an independent variable is specifically as follows:

$$P_t = \begin{bmatrix} T_P & 0_{1\times(n+1)} & 0_{1\times(n+1)} \\ 0_{1\times(n+1)} & T_P & 0_{1\times(n+1)} \\ 0_{1\times(n+1)} & 0_{1\times(n+1)} & T_P \end{bmatrix} \begin{bmatrix} c_{xk} \\ c_{yk} \\ c_{zk} \end{bmatrix} = Tc \quad (8)$$

$T_p = [1 \ t \ \ldots \ t^n] \in R^{1\times(n+1)}$, $c_* = [c_{*,0} \ c_{*,1} \ \ldots \ c_{*,n}]^T \in R^{n+1}$ is a polynomial coefficient, * represents x, y, and z, and t represents the time interval, that is, a time interval between the moment and a moment corresponding to the spatial path start point, and c refers to the centroid position change coefficient and includes all polynomial coefficients. In actual application, after the centroid position change coefficient c is obtained, the centroid position at each of the plurality of moments can be calculated according to the foregoing formula (8).

In an embodiment, a value of n is any integer greater than or equal to 2.

5: Second-order derivation is performed on the time interval t by using the foregoing formula (8), to obtain the centroid acceleration, and a fourth relational expression is obtained according to the centroid acceleration and the third relational expression.

The centroid acceleration is specifically represented as follows:

$$\ddot{p}_t = \ddot{T}c \quad (9)$$

The following fourth relational expression is obtained by substituting formula (8) and formula (9) into formula (7):

$$Gf \approx Hc - w \quad (10)$$

$H = H_0[T^T \ddot{T}^T]^T$ is related to the time interval t, formula (10) represents a relationship between a polynomial coefficient c and a foot contact force $f_i$. The relationship is actually obtained by transforming the relationship between the centroid position and the foot contact force.

In an embodiment, in actual application, because other variables in formula (10) may be obtained by means of calculation, there is a linear relationship between the centroid position change coefficient c and the foot contact force f.

6: Because values of f, H, and w may be different at different moments, the foregoing formula (10) may be further represented as the following change relationship:

$$G_k f_k = H_k c - w_k \quad (11)$$

k represents a kth moment, $f_k$ represents a foot contact force at the kth moment, $H_k$ represents a value of H at the kth moment, $w_k$ represents a value of w at the kth moment, and $G_k$ represents a value of the kth moment G.

The foregoing is an example of a process of creating the change relationship. In actual application, in the foregoing process, another dynamics equation may be used for describing the centroid motion track of the legged robot 110, and another dynamics equation is further transformed to obtain the change relationship.

II. Obtain the Constraint Condition Set:

The constraint condition set includes one or more constraint conditions, each constraint condition is used for constraining a range of values of the centroid position, and a specific form of each constraint condition may be an inequality. The constraint condition set includes at least a spatial landing point constraint condition. For a meaning of the spatial landing point constraint condition, refer to the foregoing description. Details are not described herein again. The control device 120 may obtain a constraint condition set from a network resource or another device, or may create a constraint condition set. The following uses an example to describe a manner in which the control device 120 creates each constraint condition:

(1) Obtain a spatial landing point constraint condition:

1: The control device 120 discretely calculates a plurality of positions that can be reached by the joint associated with the foot, and fits a first space according to the plurality of positions.

The foot is any foot of the legged robot 110 that needs to land, and the joint associated with the foot is any joint associated with the foot, for example, a joint directly connected to the foot, or a joint indirectly connected to the foot by using another joint. The control device 120 may determine, according to a length of the joint and a bending range of the joint, a position that can be reached by the foot in a local fixed coordinate system corresponding to the joint, where each position is represented as a point in the local fixed coordinate system, and the control device 120 performs fitting on these points to obtain the first space. The bending range of the joint is a range formed by a minimum angle and a maximum angle that the joint can bend, for example, the bending range is 0°-120°, and the bending range is generally known. For example, the joint length is 1 meter. 2: Determine a support plane from the first space.

S1.1. Determine a convex hull of the first space according to points at an uppermost layer in the first space.

Determine the points at the uppermost layer in the first space according to the first space obtained by fitting, and connect these points to obtain the convex hull.

S1.2. Divide the foot workspace into upper and lower parts by using a support plane at the bottom of the convex hull.

Selection of the support plane may be random. However, a working space of the lower part needs to be reserved as much as possible, and therefore, the resulting working space of the lower part is a convex set.

Figure 3A:
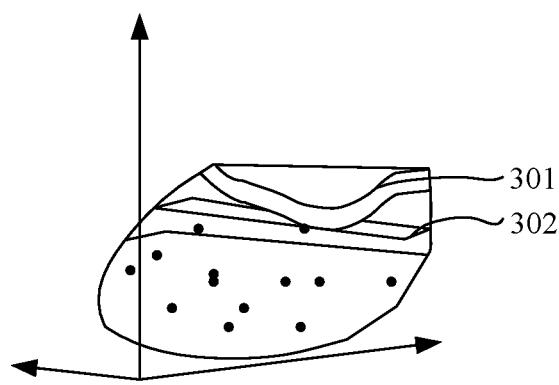
FIG. 3A is an example diagram of a first space fitted according to a position according to an embodiment of the present disclosure.

For example, referring to FIG. 3A, FIG. 3A is an example diagram of selecting a support plane: Determine a convex hull 301 from the first space according to an irregular shape generally shown in FIG. 3A in the first space obtained by fitting at each position, and determine a support plane 302 according to the convex hull, where all points below the support plane are points that can be reached by the foot.

3: Determine n intersection points between the support plane and a first space boundary, determine a first point farthest to the support plane from the first space, and determine a first (n+1) polyhedron according to the first point and the n intersection points.

For example, a value of n is four. Determine four intersection points between the support plane and a first space boundary, determine a first point farthest to the support plane from the first space, and determine a first pentahedron according to the first point and the four intersection points.

Figure 3B:
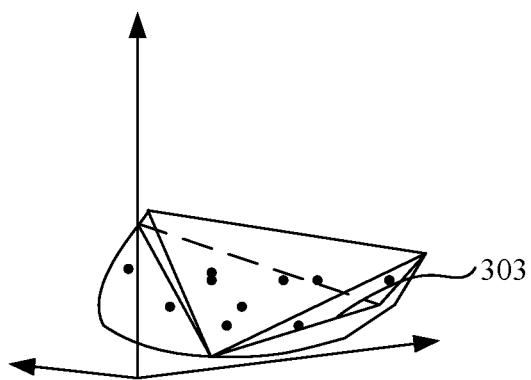
FIG. 3B is an example diagram of a support plane determined based on FIG. 3A according to an embodiment of the present disclosure.

For example, referring to FIG. 3B, FIG. 3B is an example diagram of determining a first pentahedron. For details, refer to a first pentahedron 303 in FIG. 3B.

4: Determine a second point farthest from the first (n+1) polyhedron, form a second polyhedron with the first (n+1) polyhedron according to the second point, and repeat the step described in 4 until a convex polyhedron is obtained.

Figure 3C:
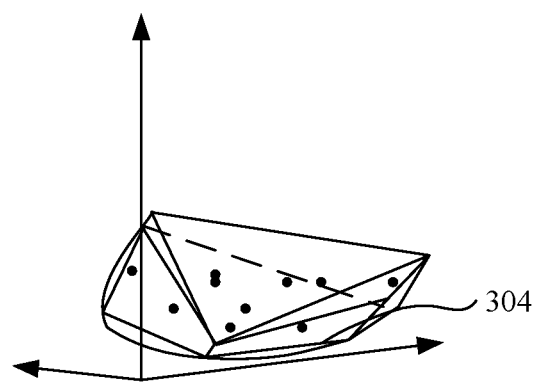
FIG. 3C is an example diagram of a first pentahedron determined based on FIG. 3B according to an embodiment of the present disclosure.
Figure 3D:
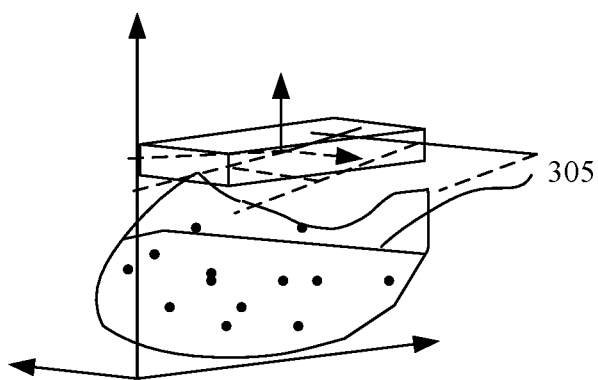
FIG. 3D is an example diagram of a convex polyhedron determined based on FIG. 3C according to an embodiment of the present disclosure.

For example, referring to FIG. 3C, a polyhedron 304 is formed, and finally a convex polyhedron 305 shown in FIG. 3D is formed.

After the convex polyhedron is obtained, the control device 120 may obtain linear inequality representations of surfaces in the convex polyhedron:

$$s_{il}^T x_i \leq d_{il}$$

where $d_{il}$ is a distance between a plane in the convex polyhedron and an origin, $s_{il}$ represents a unit normal vector corresponding to the plane in the convex polyhedron, and l represents a quantity of planes. The inequalities of the planes are combined to obtain the linear inequality as follows:

$$S_i^T x_i \leq d_i \quad (12)$$

$S_i = [s_{i1} \ s_{i2} \ \ldots \ s_{il}] \in R^{3 \times 1}$, $d_i = [d_{i1} \ d_{i2} \ \ldots \ d_{il}] \in R^1$, $x_i$ represents a target landing point of the legged robot 110 in the local fixed coordinate system, $d_{il}$ is a distance between the plane in the convex polyhedron and the origin, $s_{il}$ represents the unit normal vector corresponding to the plane in the convex polyhedron, l represents the quantity of planes corresponding to the convex polyhedron, and c represents the centroid position change coefficient.

In some embodiments, the foregoing formula (12) may be determined based on the local fixed coordinate system of the joint. The local fixed coordinate system of the joint refers to a coordinate system established by using the local fixed coordinate system of the joint as a coordinate origin, that is, the coordinate origin of the local fixed coordinate system of the joint may be different from the coordinate origin of the world coordinate system. The joint may be any joint associated with the foot of the landing point.

Figure 4:
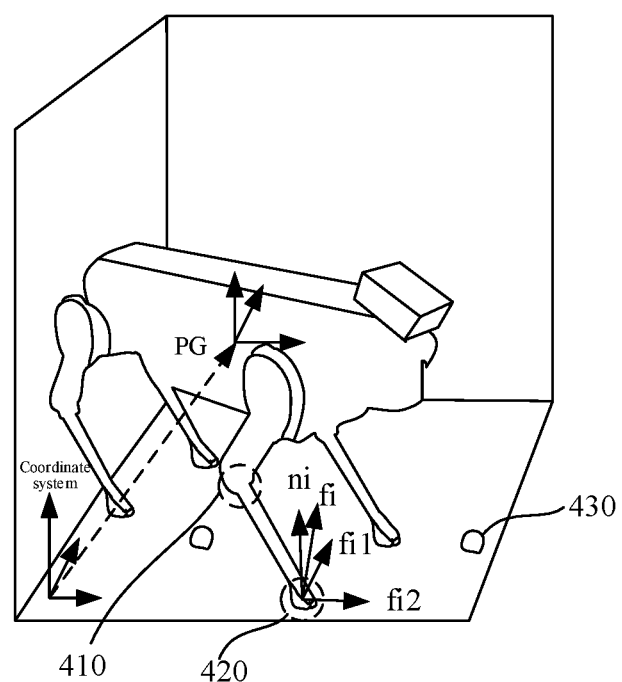
FIG. 4 is an example diagram of a structure of a legged robot according to an embodiment of the present disclosure.

For example, referring to a schematic diagram of the position of the legged robot 110 shown in FIG. 4, the legged robot 110 includes a plurality of joints 410, four feet 420, and each foot 420 is associated with a plurality of joints. The local fixed coordinate system of the joint is specifically the coordinate system shown in FIG. 4.

In the local fixed coordinate system, each variable may be decomposed into a plurality of variables along the local fixed coordinate system. For example, a contact force $f_i$ between the foot and the contact surface in FIG. 4 may be decomposed into $n_i$, $f_{i1}$, and $f_{i2}$ along the locally fixed coordinate system, and a centroid position $p_G$ may also be decomposed along the locally fixed coordinate system.

5: Convert the target landing point ri into a representation of the locally fixed coordinate system to obtain a fifth relational expression.

Because the foregoing formula (12) is a representation of the local fixed coordinate system, the target landing point ri in the world coordinate system (which may also be referred to as a global coordinate system) needs to be converted into a representation of the local fixed coordinate system. A specific conversion process is represented as follows:

$$x_i = R_{il}^T (R_0^T (r_i - p_G) - p_{il}) \quad (13)$$

$R_0 \in R^{3 \times 3}$ is a rotation matrix and represents the body posture of the legged robot 110 at the current moment, $p_{il} \in R^3$ is a first joint of the legged robot 110 relative to the centroid of the legged robot 110 in a body coordinate system, and $R_{il} \in R^3$ is the body posture of the joint relative to the body coordinate system in the local fixed coordinate system. $p_{il}$ and $R_{il}$ are constants.

In an embodiment, when a change in the body posture of the legged robot 110 is relatively small, $R_0$ may be a constant, or the control device 120 may determine $R_0$ according to the body posture of the legged robot 110 corresponding to the current moment.

3: The centroid position in the fifth relational expression is represented as an n-order polynomial related to time, and is substituted into the formula (12) to obtain a sixth relational expression:

Specifically, the foregoing formulas (4), (8), (12), and (13) are combined to obtain the following sixth relational expression:

$$A_i c \leq b_i \quad (14)$$

where:

$$A_i = -S^T R_{il}^T R_0^T T$$

$$b_i = d + S^T R_{il}^T p_{il} - S^T R_{il}^T R_0^T (r_i - p^{init})$$

$A_i$ indicates a value of A corresponding to an ith foot, and $b_i$ indicates a value of b corresponding to the ith foot.

4: The target landing point and the moment are introduced into the sixth relational expression to obtain a spatial landing point constraint condition.

① The target landing point position corresponding to the moment is introduced into the sixth relational expression to obtain a seventh relational expression, which is represented as:

$$Ac \leq b \quad (15)$$

A matrix A and a vector b are determined according to the moment, the quantity of landing feet at the time, and the target landing point.

② To ensure that the robot can reach the expected contact position at a moment in the generated motion process, h moments are set, and it is required that each moment can meet the foregoing formula (15). Further, the moment may be introduced into the seventh relational expression, and the following spatial landing point constraint condition is obtained:

$$A_h c \leq b_h, h = 1, 2, 3 \ldots H \quad (16)$$

A value of h may be the same as or different from a value of k in the foregoing. $A_h$ represents a value of A corresponding to the hth moment, and $b_h$ represents a value of b corresponding to the hth moment.

In addition to the spatial landing point constraint condition, the constraint condition set may further include a friction constraint condition used for constraining a friction between a foot that is in contact with the contact surface at each sampling moment and the contact surface. The following provides an example for describing a manner in which the control device 120 creates the friction constraint condition.

(2) Obtain the friction constraint condition:

1: Determine a friction constraint representation corresponding to the foot at each moment, to obtain an eighth relational expression:

The contact force $f_i$ (i=1, 2 ... Nc) between each foot and the contact surface is constrained by the friction, which may be approximated as the following eleventh relational expression:

$$N_i^T f_i \leq 0 \quad (17)$$

$N_i=-[\mu_i n_i-o_i\mu_i n_i+o_i\mu_i n_i-t_i\mu_i n_i+t_i]\in R^{3\times 4}$, $n_i$ represents a normal vector of a target landing point of an ith foot, $o_i$ represents a vector in a tangent direction of the target landing point of the ith foot, $t_i$ represents a vector in another tangent direction of the target landing point of the ith foot, and $\mu_i$ represents a friction coefficient.

When a material of a contact surface contacted by a foot is different, a corresponding value of a friction coefficient may also be different. At the same moment, contact surfaces contacted by different feet are different, and friction coefficients between different feet and a contact surface may also be different.

2: In the eighth relational expression, the time and the landing foot are introduced to obtain a friction constraint condition.

A ninth relational expression is obtained by combining friction constraints corresponding to all feet.

$$N^T f \leq 0 \tag{18}$$

where, $$N^T f \leq 0 \tag{18}$$

$$N^T = \begin{bmatrix} N_1^T & 0 & \cdots & 0 \\ 0 & N_2^T & \cdots & 0 \\ \vdots & \vdots & \ddots & 0 \\ 0 & 0 & \cdots & N_{Nc}^T \end{bmatrix} \in R^{4Nc \times 3Nc}.$$

At different moments, contact forces are different. Therefore, a moment may be introduced in formula (18) to obtain a friction constraint condition as follows:

$$N_k^T f_k \leq 0 \tag{19}$$

$N_k^T$ represents a value of $N^T$ at a kth moment, and $f_k$ represents a foot contact force at the kth moment.

Because the change relationship and the constraint condition set are corresponding to a relatively small quantity of relational expressions, and a relatively large quantity of unknown quantities need to be solved, there may be more than one centroid position change coefficient that meets the change relationship and the constraint condition set. Therefore, when the foregoing centroid position change coefficient is actually calculated, the target centroid position change coefficient may be randomly determined from a value that meets the change relationship and the constraint condition set. Alternatively, to obtain a better centroid position change coefficient, in this embodiment of the present disclosure, an objective function may further be introduced, and an optimal centroid position change coefficient is further selected by using the objective function, so that the optimal centroid position change coefficient is determined as the target centroid position change coefficient.

Because the quadratic programming problem can certainly obtain a corresponding solution, in this embodiment of the present disclosure, a problem of determining the target centroid position change coefficient may be converted into a quadratic programming problem. Therefore, the objective function in this embodiment of the present disclosure includes at least one quadratic term of one or more variables, and one or more variables may be any variable related to a candidate result that meets the change relationship and the constraint condition set. The quadratic term may be constructed according to the quadratic of the variable.

In one embodiment, the object function includes at least one of the following:

A1: a quadratic term related to a change amount of the foot contact force in the motion path;

A2: a quadratic term of a change amount of the centroid position in the motion path;

A3: a quadratic term of a difference between an end centroid position of the spatial path end point in the centroid state data and a centroid position of the spatial path end point in the candidate result;

A4: a quadratic term of a difference between an end centroid speed of the spatial path end point in the centroid state data and a centroid speed of the spatial path end point in the candidate result; and A5: a quadratic term of a difference between an end centroid acceleration of the spatial path end point in the centroid state data and a centroid acceleration of the spatial path end point in the candidate result.

The following analyzes the functions of the foregoing quadratic items:

Function of A1: The change amount of the foot contact force may be used for optimizing force distribution between the foot and the contact surface, so that action forces between the foot of the legged robot 110 and the contact surface are more evenly distributed during walking.

Function of A2: The centroid position change amount reflects a length of the centroid motion track, and helps reduce a concussion amplitude of the centroid motion track.

Functions of A3-A5: They help reduce an error between a calculation result and an actual result.

In combination with the foregoing A1-A5, an expression of the objective function is as follows:

$$J_{grf}+J_{len}+J_{tgt} \tag{20}$$

$J_{grf}$ is a weighted square sum of all foot contact forces in the motion path, $J_{len}$ is a weighted square sum of differences between centroid position changes at each two moments, $J_{tgt}$ is a weighted square sum of a difference between an end centroid position of a spatial path end point in centroid state data and a centroid position of the spatial path end point in the candidate result, a difference between a centroid speed corresponding to the end position in the candidate result and a centroid speed corresponding to the state data in the end position, and a difference between a centroid acceleration corresponding to the end position in the candidate result and a centroid acceleration corresponding to the state data in the end position.

Figure 5:
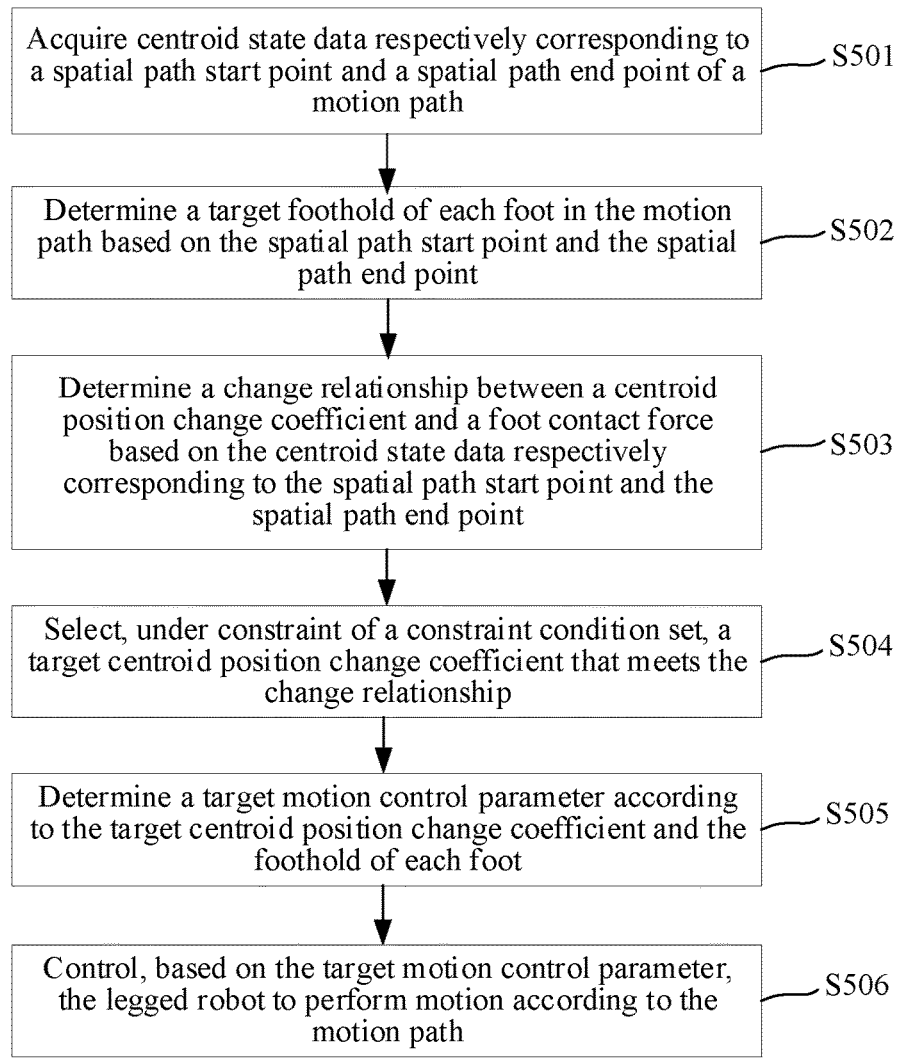
FIG. 5 is a flowchart of a legged robot motion control method according to an embodiment of the present disclosure.

After the content of the change relationship, the constraint condition set, and the objective function is described, the following describes, with reference to the process of the legged robot motion control method shown in FIG. 5, a process of specifically constructing the change relationship and the constraint condition set by using this embodiment of the present disclosure, and determining the centroid position by using an example. The method includes the following steps:

S501. Acquire centroid state data respectively corresponding to a spatial path start point and a spatial path end point of a motion path.

When the legged robot 110 is controlled to move, the control device 120 implements movement of the legged robot 110 by controlling lifting and landing of the foot of the legged robot 110, so that the legged robot 110 can complete motion of the entire motion path from the spatial path start point to the spatial path end point. The spatial path start point is a position of the legged robot 110 at the current moment. The spatial path end point is a position to be reached by the legged robot 110, and the spatial path end point may be set in advance, or the control device 120 determines it according to a task to be executed by the legged robot 110.

For a meaning of the centroid state data and a manner of obtaining the centroid state data, refer to the foregoing content. Details are not described herein again. The centroid state data may include a centroid position. Alternatively, the control device 120 may obtain the other two values according to one of the centroid position, the centroid speed, or the centroid acceleration. The centroid position, the centroid speed, or the centroid acceleration may be represented by coordinates in a coordinate system, or may be represented by a vector, or the like.

In an embodiment, the motion path, the spatial path start point, and the spatial path end point are related to a sampling period of the legged robot 110, and the motion path, the spatial path start point, and the spatial path end point may be flexibly set according to an actual requirement.

For example, the control device 120 may determine the position of the legged robot 110 at the current moment as the spatial path start point, and the control device 120 may determine the position in which the 3s legged robot 110 is to be located as the spatial path end point. In a next sampling period, the position of the 3s legged robot 110 may be selected as the spatial path start point of motion of the legged robot 110.

S502. Determine a target landing point of each foot in the motion path based on the spatial path start point and the spatial path end point.

In a process from the spatial path start point to the spatial path end point, the legged robot 110 may have one or more feet for landing, and each foot may land for one or more times. A specific landing point is related to the specified spatial path start point and spatial path end point. The control device 120 may determine a target landing point in advance for a foot that needs to land each time. The target landing point is a landing point corresponding to the legged robot 110 in the motion path. The target landing point may be represented by coordinates or vectors in the world coordinate system.

In some embodiments, the control device 120 may collect the environment image of the legged robot 110 by using the visual sensing unit 210, and construct a conversion relationship between each pixel in the environment image and the world coordinate system. The control device 120 determines the target landing point in a moving direction from the spatial path start point to the spatial path end point by using the environment image and the conversion relationship.

The control device 120 may specifically identify an obstacle from the spatial path start point to the spatial path end point according to the environment image, determine, according to the conversion relationship, a position of a non-obstacle in the moving direction corresponding to the spatial path start point to the spatial path end point, and use the determined position as the target landing point.

Alternatively, the control device 120 collects a three-dimensional point cloud map of the environment by using the visual sensing unit 210, and determines the target landing point from the three-dimensional point cloud map according to the three-dimensional point cloud map of the environment. Specifically, the position of the non-obstacle may be determined from the three-dimensional point cloud map as the target landing point. When the visual sensing unit 210 is an RGBD camera, a three-dimensional point cloud map may be obtained by means of collection, or for example, a plurality of environment images in which the legged robot 120 is currently located are collected, and three-dimensional reconstruction is performed on the plurality of environment images to obtain the three-dimensional point cloud map.

Alternatively, the control device 120 may randomly select a plurality of positions in the moving direction from the spatial path start point to the spatial path end point as the target landing point.

Because the legged robot 110 may land more than once in a motion path process, the control device 110 may determine a target landing point corresponding to each landing of the robot in the motion path. Alternatively, when the target landing point is determined, a large area in which the legged robot 110 may land may be determined according to a motion speed of the legged robot 110, and the target landing point is successively selected, in any one of the foregoing manners, from the large area corresponding to each landing.

For example, continuing to refer to FIG. 4, the current position of the legged robot 110 is shown in FIG. 4, and the control device 120 separately determines a target landing point 430 of each foot, which is specifically a circle on the ground shown in FIG. 4.

S503. Determine a change relationship between a centroid position change coefficient and a foot contact force based on the centroid state data respectively corresponding to the spatial path start point and the spatial path end point.

The change relationship is, for example, the foregoing formula (11), and for a meaning of the change relationship, refer to the foregoing content. Details are not described herein again.

If motion control of the legged robot 110 is to be implemented, the centroid position of the legged robot 110 from the spatial path start point to the spatial path end point needs to be obtained theoretically. However, in this case, a calculation amount is relatively large. Therefore, in this embodiment of the present disclosure, the control device 120 may obtain a centroid position at each of a plurality of moments in the motion path, and determine a centroid motion track based on the centroid positions at the plurality of moments.

Referring to the change relationship shown in the foregoing formula (1), in the change relationship, in addition to the centroid change coefficient setting and the foot contact force, parameters such as $H_k$ and $w_k$ are further included in the change relationship. Therefore, these parameters may be obtained by using a known quantity such as the centroid state data, so as to obtain a change relationship that includes only two unknown quantities: the centroid position change coefficient and the foot contact force.

The following describes a specific example of a manner in which the control device 120 obtains the change relationship.

S1.1. Obtain a plurality of sampling moments.

The control device 120 may obtain, according to the length of the motion path and the motion speed of the legged robot 110, moving duration required by the legged robot to complete the motion path, or the control device 120 directly obtains moving duration required by the preconfigured motion path.

After the moving duration is obtained, the control device 120 may randomly sample the moving duration to obtain a plurality of sampling moments. Alternatively, the control device 120 may separately perform sampling in duration of each motion stage according to the stepping sequence of the legged robot 110, to obtain a plurality of sampling moments. Because a sampling moment corresponding to each motion stage exists, accuracy of a centroid motion track determined later is improved.

In an embodiment, a time interval between any two adjacent sampling moments may be the same, or may be different. Being different means that a time interval between any two adjacent sampling moments is not completely the same, or a time interval between any two adjacent sampling moments is different.

In an embodiment, the more the obtained quantity of sampling times, the more proper sampling time distribution, the more reliable the determined centroid motion track is. However, more sampling moments require a larger quantity of relational expressions required for subsequently resolving the centroid position change coefficient, and a longer time required for solving the centroid position change coefficient. Therefore, it is extremely important to properly plan a quantity of sampling points. In this embodiment of the present disclosure, the sampling moment includes at least a start moment and an end moment of each motion stage, and at least one intermediate moment of each motion stage. The intermediate moment refers to any moment between the start moment and the end moment of the motion stage.

For example, a quadruped walking gait of the legged robot 110 is set as a sampling period, and the control device 120 sequentially divides a movement process of the legged robot 110 in the sampling period into eight motion stages, where the eight motion stages are specifically: four-legged support movement centroid (4S for short), hind right foot (HR for short), fore right foot (FR for short), four-legged support movement centroid (4S for short), four-legged support movement centroid (4S for short), hind left foot (HL for short), fore left foot (FL for short), and four-legged support movement centroid (4S for short).

Figure 6:
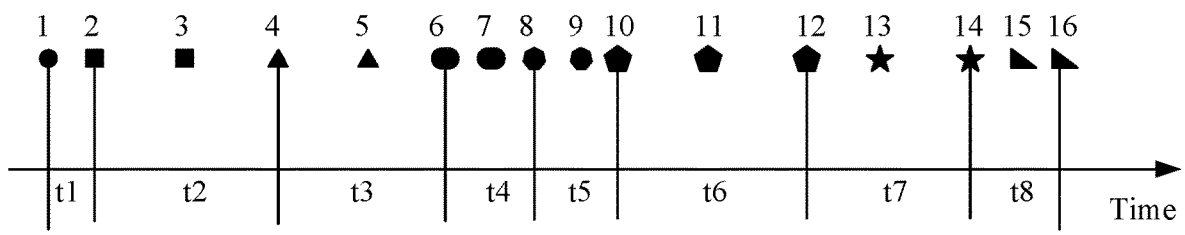
FIG. 6 is a schematic distribution diagram of sampling moments according to an embodiment of the present disclosure.

Referring to a schematic diagram of sampling moment distribution shown in FIG. 6, duration of the eight motion stages may be respectively represented as t1, t2, t3, t4, t5, t6, t7, and t8 shown in FIG. 6. For ease of description, the eight motion stages are respectively referred to as a first motion stage, a second motion stage, and so on. The control device 120 samples each motion stage to obtain sampling moments 1 and 2 in the first motion stage shown in FIG. 6, sampling moments 2, 3, and 4 in the second motion stage, sampling moments 4, 5, and 6 in the third motion stage, and sampling moments 6, 7, and 8 in the fourth motion stage, so as to successively obtain a plurality of sampling moments corresponding to each motion stage. In FIG. 6, sampling moments of the same shape are sampling moments of the same motion phase, and sampling moments of different shapes belong to two different motion phases.

Because motion stages in a sampling period are consecutive, an end moment of a motion stage may be considered as a sampling moment in the motion stage, and may be considered as a sampling moment in a next motion stage. For example, the sampling moment 6 in FIG. 6 may be considered as a sampling moment in the third motion stage and the fourth motion stage.

S1.2. Determine a plurality of sampling moments from the moving duration, and determine a time interval between each sampling moment and a moment corresponding to the spatial path start point as a time interval corresponding to the sampling moment.

The control device 120 knows a start moment corresponding to the spatial path start point and each sampling moment. Therefore, a time interval between each sampling moment and the start moment may be determined. A plurality of time intervals may be obtained corresponding to a plurality of sampling moments.

S1.3. Obtain a change relationship between the centroid position change coefficient and a foot contact force at each sampling moment according to a time interval corresponding to each sampling moment, the start centroid position, and a relational expression between a centroid position and the foot contact force at each sampling moment.

A relational expression between the centroid position at each sampling moment and the foot contact force is a pre-stored relational expression, and the relational expression is specifically described in the foregoing formula (2).

The control device 120 may determine values of $H_k$ and $w_k$ in the foregoing formula (11) according to a time interval and a start centroid position that are corresponding to each sampling moment, so that a change relationship between only two unknown quantities, a centroid position change coefficient and a foot contact force at each sampling moment can be obtained.

As described in the foregoing, $H = H_0 [T^T \ddot{T}^T]^T$, $$H_0 = m \begin{bmatrix} 0_{3 \times 3} \\ \hat{g} \end{bmatrix},$$

a time interval corresponding to each sampling moment is substituted into two formulas, and a value of $H_k$ corresponding to each moment may be calculated.

$w_k$ may be a fixed value, or a value of a gravity of the legged robot 110, a start centroid position, and a centroid angular momentum L at a kth moment are substituted into the foregoing formula $$w = \begin{bmatrix} mg \\ m\hat{p}^{init}g - \dot{L} \end{bmatrix},$$

so as to calculate a value of $w_k$ corresponding to each sampling moment. The centroid angular momentum may be calculated by using a body posture of the legged robot 110 at each sampling moment. The kth moment is a selected sampling moment, and therefore the kth moment may be referred to as the kth sampling moment.

Further, because the control device 120 obtains the stepping sequence of the legged robot 110, when the stepping sequence is determined, the control device 120 can determine a foot for landing each time, and can also correspondingly obtain a position $r_{ij}$ of some sampling times at which the legged robot 110 contacts the contact surface in the world coordinate system.

For example, continue to refer to the example shown in FIG. 6:

(1) When the legged robot is in a 4S phase, and $G_k$ is a 3×4 matrix, specifically, it may be obtained according to formula (3) according to the target landing point of the legged robot at the corresponding moment. $f_k$ is a 12-dimensional vector, $N_k$ is a 16×12 matrix, and $N_k$ is obtained by means of calculation according to a normal direction, a tangent vector, and a friction coefficient that are of the target landing point of the legged robot at the corresponding moment.

When the robot is in a different phase, a quantity, a position, and other related information of the target landing point may change, $G_k$ and $N_k$ will change with time, and $H_k$ and $w_k$ will also change with time, and finally, there is a change relationship between a centroid position change coefficient at each moment and a foot contact force corresponding to each sampling moment.

S504. Select, under constraint of a constraint condition set, a target centroid position change coefficient that meets the change relationship.

The constraint condition set includes at least a spatial landing point constraint condition. For a meaning and a specific expression of the spatial landing point constraint condition, refer to the foregoing description. Details are not described herein again. For the spatial landing point constraint condition, refer to the foregoing formula (16).

Because a unique solution cannot be obtained according to the change relationship at each sampling moment and the constraint condition set, the control device 120 may determine a plurality of groups of candidate results that meet the change relationship and the constraint condition set at each sampling moment. Each group of candidate results includes a centroid position change coefficient. The candidate result may further include a contact force corresponding to each sampling moment. The control device 120 may select a target centroid position change coefficient from the centroid position change coefficients respectively included in the plurality of groups of candidate results.

Alternatively, the control device 120 may determine the target centroid position change coefficient from the plurality of groups of candidate results according to an objective function. The following provides an example of a process in which the control device 120 determines the plurality of groups of candidate results.

Step 1: Determine a target constraint relationship of a centroid position change coefficient at each sampling moment as a target constraint condition corresponding to each sampling moment according to a foot in contact with a contact surface at each sampling moment, a body posture of the legged robot 110 each sampling moment, a target landing point of each foot, and the spatial landing point constraint condition.

For an expression of the spatial landing point constraint condition, reference may be made to the foregoing formula (16). In addition to the centroid position change coefficient c, formula (16) further includes some variations that need to be solved by the control device 120, which specifically include $A_h$ and $b_h$ in formula (16). The following provides an example for describing a manner in which the control device 120 determines these variations.

When a change in the body posture of the legged robot 110 is relatively small, the control device 120 may determine values of the change amount $A_h$ and $b_h$ in the spatial landing point constraint condition according to the quantity of feet that are in contact with the contact surface at each sampling moment, a rotation range of a joint corresponding to the foot of the legged robot 110, and a length of the joint, so as to obtain a target constraint relationship of the centroid position change coefficient c. Because values of $A_h$ and $b_h$ at each sampling moment may be different, a target constraint relationship corresponding to each sampling moment may be obtained.

Alternatively, when the change in the body posture of the legged robot 110 is relatively large and cannot be ignored, the control device 120 may determine the values of the change amount $A_h$ and $b_h$ according to the quantity of feet that are in contact with the contact surface at each sampling moment, the body posture of the legged robot 110, the rotation range of the joint corresponding to the foot of the legged robot 110, and the length of the joint, so as to obtain the target constraint relationship of the centroid position change coefficient c.

In an embodiment, a rotation range and a length of a joint corresponding to a foot of the legged robot 110 may be obtained by the control device 120 by using a default joint length and bending range of the joint, or a length and a bending range of the joint of the legged robot 110 that are pre-obtained by the control device 120. Rotation ranges and lengths of joints corresponding to any two feet of the legged robot 110 may be the same or may be different.

In one embodiment, when the constraint condition set further includes a friction constraint condition, (for a meaning of the friction constraint condition, refer to the foregoing description, and details are not described herein again), the control device 120 may obtain, according to a sampling moment and a friction constraint condition, a constraint relationship between a target landing point and a foot contact force that are corresponding to each sampling moment.

2: Combine a change relationship at each sampling moment and a target constraint relationship at each sampling moment to obtain a plurality of groups of candidate results.

The control device 120 may determine, according to the change relationship at the sampling moment and the target constraint relationship at each sampling moment, each group of candidate results that meet these relationships. For a meaning of the candidate result, refer to the foregoing description. Details are not described herein again.

In an embodiment, if the constraint condition set further includes friction constraint conditions, the determined each group of candidate results also needs to meet these constraint conditions.

For example, the candidate result needs to specifically meet the following relational expression:

$$\begin{cases} G_k f_k = H_k c - w_k \\ N_k^T f_k \le 0 \\ k = 1, 2 \dots K \\ A_h c \le b_h \\ h = 1, 2, 3 \dots H \\ T(0)c = 0,\ \dot{T}(0)c = v_0,\ \ddot{T}(0)c = a \end{cases} \quad (21)$$

k represents any sampling moment, h represents any sampling moment, $v_0$ represents the centroid speed, and a represents the centroid acceleration.

In one embodiment, the control device 120 may randomly determine a candidate result from a plurality of groups of candidate results as a final target result.

3: Minimize the objective function according to a plurality of candidate results to obtain a target result.

In this embodiment of the present disclosure, the control device 120 obtains the final target result with reference to the objective function.

Specifically, after obtaining the candidate result, the control device 120 may determine a value of the objective function corresponding to each group of candidate results, and determine a candidate result with the minimum value of the corresponding objective function as the target result. The following uses the foregoing formula (20) as an example to describe a process in which the control device 120 obtains a value of the objective function corresponding to a group of candidate results.

(1) The control device 120 obtains, according to the centroid positions of each sampling moment in a plurality of sampling moments in the group of candidate results, a foot contact force corresponding to each sampling moment, and determines a weighted square sum of the foot contact forces, so as to obtain a value of $J_{grf}$ in the objective function shown in formula (20). Weighting weights of the contact forces may be the same, or may be different.

(2) The control device 120 determines a weighted square of a difference between centroid positions of every two adjacent sampling moments in the plurality of sampling moments, so as to obtain the value of Jaen in the objective function shown in formula (20). Weighting weights of the centroid positions may be the same, or may be different.

(3) The control device 120 determines a weighted sum of the following three values: a difference between the centroid position corresponding to the spatial path end point in the candidate result and the centroid position of the spatial path end point in the centroid state data, a difference between the centroid speed corresponding to the spatial path end point in the candidate result and the centroid speed of the spatial path end point in the centroid state data, and a difference between the centroid acceleration corresponding to the spatial path end point in the candidate result and the centroid acceleration of the spatial path end point in the centroid state data, so as to obtain the value of $J_{tgt}$ in the objective function shown in formula (20).

After the value of $J_{grf}$, the value of Jaen, and the value of $J_{tgt}$ in the objective function shown in formula (20) are obtained, the control device 120 determines a sum of the value of $J_{grf}$, the value of $J_{len}$, and the value of $J_{tgt}$, so that the value of the objective function corresponding to the candidate result is determined.

S505. Determine a target motion control parameter according to the target centroid position change coefficient and the target landing point of each foot.

After obtaining the target result, the control device 120 also obtains the centroid position change coefficient. The control device 120 may obtain the centroid positions at the plurality of sampling moments according to the centroid position change coefficient and a corresponding time interval. For specific calculation formulas involved, refer to the foregoing formula (4) and formula (8).

After obtaining centroid positions at a plurality of sampling moments, the control device 120 may fit a centroid motion track according to the centroid positions at the plurality of sampling moments, or may interpolate the centroid positions at the plurality of sampling moments, so as to obtain the centroid motion track of the legged robot 110. There are a plurality of fitting manners, which are not limited herein. After the centroid motion track is obtained, the centroid position of the legged robot 110 at each moment is obtained.

Figure 7:
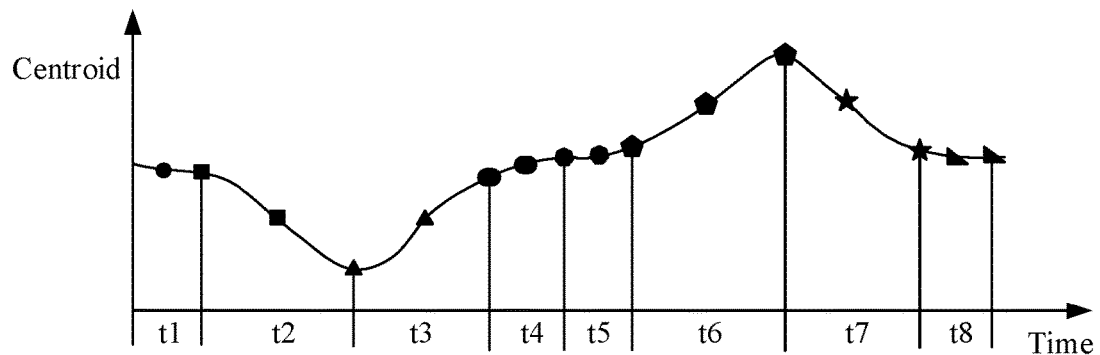
FIG. 7 is a schematic diagram of a centroid motion track according to an embodiment of the present disclosure.

For example, referring to FIG. 7, FIG. 7 shows a centroid motion track fitted according to a target result determined in FIG. 6. It may be learned from FIG. 7 that the centroid position continuously changes with different motion stages.

Further, the control device 120 may calculate, by using inverse kinematics, a whole-body motion track of the legged robot 110 according to the centroid position and the target landing point of the legged robot 110, where the whole-body motion track includes joint angles of joints corresponding to the legged robot 110 at each moment. The joint angles are used for representing angles presented after the joints of the legged robot are rotated. Then, joint torques of a plurality of joints of the robot in the motion path are determined by using inverse dynamics and an optimization control method. Both the joint torque and the joint angle may be considered as target motion control parameters.

S506. Control, based on the target motion control parameter, the legged robot to perform motion according to the motion path.

Specifically, the control device 120 may control each joint of each foot of the legged robot 110, so as to raise or fall each foot of the legged robot, thereby driving the legged robot 110 to move along the motion path. The control device 120 specifically controls joint torques of a plurality of joints of the legged robot 110 to enable at least one foot of the legged robot to support the legged robot moving, so that a true centroid position of the legged robot is kept at the determined centroid position as much as possible.

In this embodiment of the present disclosure, when the centroid position of the legged robot 110 is determined, the spatial landing point constraint condition is introduced, so that the determined centroid position can meet the spatial landing point constraint condition, and a degree of correspondence between the determined centroid position and the actual moving process of the legged robot is improved, that is, adaptability of the centroid position to an actual moving environment is improved, and properness of the joint torque determined based on the centroid position and the target landing point is further improved.

Figure 8:
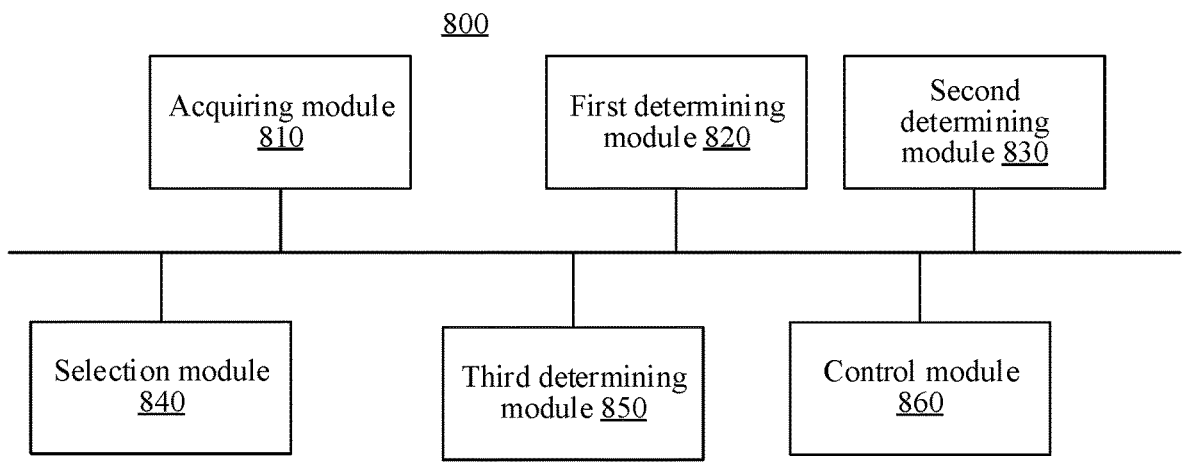
FIG. 8 is a schematic structural diagram of a legged robot motion control apparatus according to an embodiment of the present disclosure.

Based on the same inventive concept, an embodiment of the present disclosure provides a legged robot motion control apparatus. The apparatus is equivalent to the foregoing described control device 120. Referring to FIG. 8, the legged robot motion control apparatus 800 includes:

an acquiring module 810, configured to acquire centroid state data respectively corresponding to a spatial path start point and a spatial path end point of a motion path;

a first determining module 820, configured to determine a target landing point of each foot in the motion path based on the spatial path start point and the spatial path end point;

a second determining module 830, configured to determine a change relationship between a centroid position change coefficient and a foot contact force based on the centroid state data respectively corresponding to the spatial path start point and the spatial path end point;

a selection module 840, configured to select, under constraint of a constraint condition set, a target centroid position change coefficient that meets the change relationship; the constraint condition set including at least a spatial landing point constraint condition, and the spatial landing point constraint condition being used for constraining a value of the centroid position change coefficient, so that the legged robot is capable of reaching the target landing point;

a fourth determining module 850, configured to determine a target motion control parameter according to the target centroid position change coefficient and the target landing point of each foot; and a control module 860, configured to control, based on the target motion control parameter, the legged robot to perform motion according to the motion path.

In one embodiment, the centroid state data corresponding to the spatial path start point includes a start centroid position of the spatial path start point, and the second determining module 830 is specifically configured to:

obtain moving duration required by the legged robot to complete the motion path;

determine a plurality of sampling moments from the moving duration, and determine a time interval between each sampling moment and a moment corresponding to the spatial path start point as a time interval corresponding to the sampling moment; and obtain a change relationship between the centroid position change coefficient and a foot contact force at each sampling moment according to a time interval corresponding to each sampling moment, the start centroid position, and a relational expression between a centroid position and the foot contact force at each sampling moment.

In one embodiment, the second determining module 830 is specifically configured to:

determine a centroid angular momentum at each sampling moment according to a body posture of the legged robot at each sampling moment; and obtain the change relationship between the centroid position change coefficient and the foot contact force at each sampling moment according to the centroid angular momentum at each sampling moment, the time interval corresponding to each sampling moment, the start centroid position, and the relational expression between the centroid position and the foot contact force at each sampling moment.

In one embodiment, the selection module 840 is specifically configured to:

determine a target constraint relationship of a centroid position change coefficient at each sampling moment as a target constraint relationship corresponding to each sampling moment according to a foot in contact with a contact surface at each sampling moment, a body posture of the legged robot at each sampling moment, a target landing point of each foot, and the spatial landing point constraint condition; and select the target centroid position change coefficient that meets the target constraint relationship corresponding to each sampling moment and the change relationship between the centroid position change coefficient and the foot contact force at each sampling moment.

In one embodiment, the second determining module 830 is further configured to:

determine, for each sampling moment according to a rotation range and a length of a joint associated with a foot in contact with the contact surface at the sampling moment, a plurality of positions accessible to the foot in contact with the contact surface; and fit the plurality of positions to obtain the spatial landing point constraint condition of the legged robot.

In one embodiment, the selection module 840 is specifically configured to:

obtain, under constraint of the constraint condition set, a plurality of groups of candidate results that meet the change relationship; each group of candidate results including a centroid position change coefficient; and minimize an objective function according to the plurality of groups of candidate results, and determine a target result from the plurality of groups of candidate results; the objective function being a quadratic term constructed according to a correlation quantity of the candidate result.

In one embodiment, the objective function includes at least one of the following:

a quadratic term related to a change amount of a foot contact force in the motion path;

a quadratic term of a change amount of a centroid position in the motion path;

a quadratic term of a difference between an end centroid position of the spatial path end point in the centroid state data corresponding to the spatial path end point and a centroid position of the spatial path end point in the candidate result;

a quadratic term of a difference between an end centroid speed of the spatial path end point in the centroid state data corresponding to the spatial path end point and a centroid speed of the spatial path end point in the candidate result; and a quadratic term of a difference between an end centroid acceleration of the spatial path end point in the centroid state data corresponding to the spatial path end point and a centroid acceleration of the spatial path end point in the candidate result.

In one embodiment, the constraint condition set further includes:

a friction constraint condition used for constraining a friction between a foot of a landing point and the contact surface; and the friction between the foot of the landing point and the contact surface is determined according to the foot contact force and a friction coefficient.

In one embodiment, the first determining module 820 is specifically configured to:

collect a three-dimensional point cloud map of an environment in which the legged robot is currently located; and determine, from the three-dimensional point cloud map according to a foot of the legged robot in each contact with the contact surface in the motion path, a target landing point corresponding to the foot in each contact with the contact surface.

In one embodiment, the third determining module 850 is specifically configured to:

determine a centroid position of the legged robot at any moment according to the target centroid position change coefficient; and determine a joint torque of the legged robot at any moment according to the centroid position of the legged robot at any moment and the target landing point of each foot.

The legged robot motion control apparatus 800 shown in FIG. 8 may be configured to implement any legged robot motion control method described in the foregoing. Details are not described herein again.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Based on the same inventive concept, an embodiment of the present disclosure further provides a legged robot motion control device. The legged robot motion control device can be configured to implement a function of the foregoing legged robot 110, or can be configured to implement a function of the foregoing control device 120.

Figure 9:
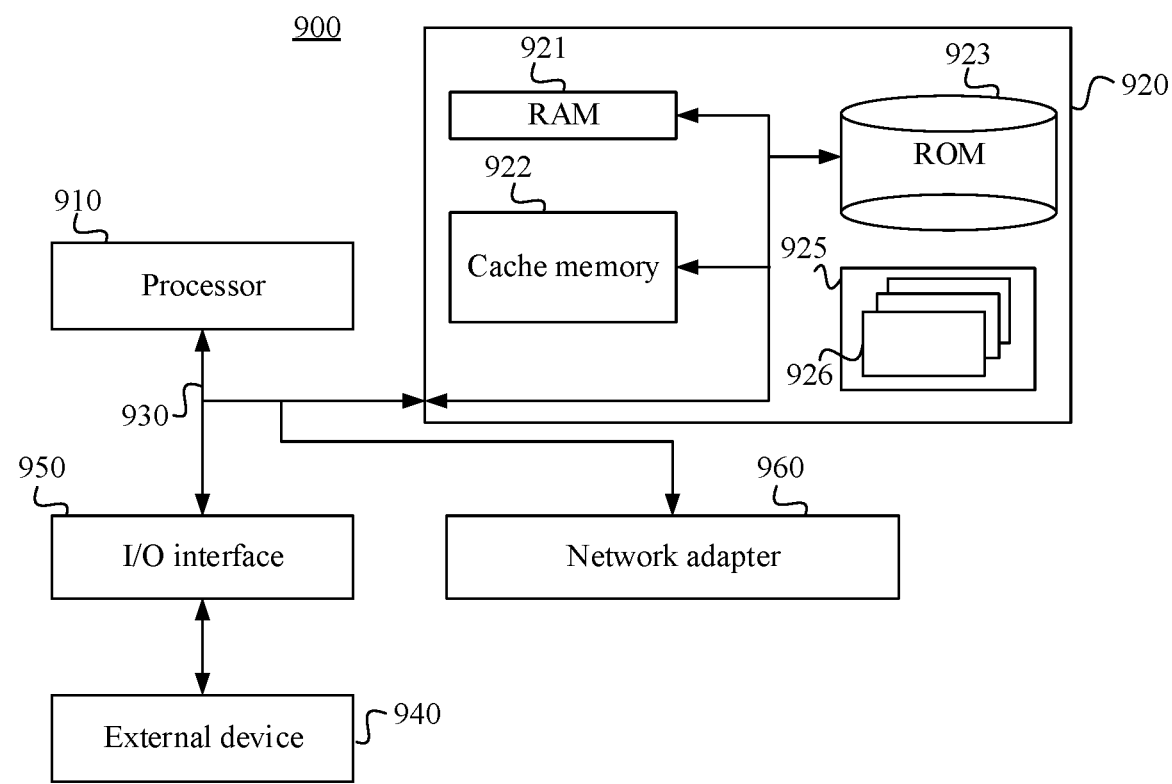
FIG. 9 is a schematic structural diagram of a legged robot motion control device according to an embodiment of the present disclosure.

Referring to FIG. 9, a legged robot motion control device 900 is represented as a general computer device. Components of the computer device 900 may include but are not limited to: at least one processor 910, at least one memory 920, and a bus 930 connected to different system components (including the processor 910 and the memory 920).

The bus 930 represents one or more of several types of bus structures, including a memory bus or a memory controller, a peripheral bus, a processor, or a local bus using any bus structure among various bus structures.

The memory 920 may include a readable medium in a form a volatile memory, such as a random access memory (RAM) 921 and/or a cache memory 922, and may further include a read-only memory (ROM) 923. The memory 920 may further include a program/utility tool 926 having a group of (at least one) program modules 925. Such a program module 925 includes, but is not limited to, an operating system, one or more application programs, other program modules, and program data. Each or a combination of these examples may include implementation of a network environment. The processor 910 is configured to execute program instructions stored in the memory 920 and the like to implement the foregoing legged robot motion control method.

The computer device 900 may communicate with one or more external devices 940 (such as a keyboard and a pointing device), may further communicate with a plurality of devices that enable a terminal to interact with the computer device 900, and/or communicate with any device (such as router or a modem) that enables the computer device 900 to communicate with one or more other devices. This communication may proceed through an input/output (I/O) interface 950. In addition, the computer device 900 may further communicate with one or more networks such as a local area network (LAN), a wide area network (WAN), and/or a public network (such as the Internet) through a network adapter 960. As shown in the figure, the network adapter 960 communicates with other modules of the computer device 900 by using the bus 930. It is to be understood that although not shown in the figure, other hardware and/or software modules may be used in combination with the computer device 900, including, but not limited to microcode, a device driver, a redundancy processing unit, an external disk drive array, a RAID system, a tape drive, a data backup storage system, or the like.

Based on the same inventive concept, an embodiment of the present disclosure provides a storage medium, where the storage medium stores computer instructions, and when the computer instructions are run on a computer, the computer performs the foregoing legged robot motion control method.

Based on the same inventive concept, an embodiment of the present disclosure provides a computer program product, where the computer program product includes computer instructions, and the computer instructions are stored in a computer readable storage medium. A processor of a computer device reads the computer instructions from the computer readable storage medium, and the processor executes the computer instructions, so that the computer device performs the foregoing legged robot motion control method.

A person skilled in the art is to understand that the embodiments of the present disclosure may be provided as a method, a system, or a computer program product. Therefore, the present disclosure may take the form of hardware-only embodiments, software-only embodiments, or embodiments with a combination of software and hardware. In addition, the present disclosure may use a form of a computer program product that is implemented on one or more computer-usable storage media (including but not limited to a disk memory, a CD-ROM, an optical memory, and the like) that include computer-usable program code.

Certainly, a person skilled in the art can make various modifications and variations to the present disclosure without departing from the spirit and scope of the present disclosure. In this case, if the modifications and variations made to the present disclosure fall within the scope of the claims of the present disclosure and equivalent technologies thereof, the present disclosure is intended to include these modifications and variations.

What is claimed is:

1. A legged robot motion control method, performed by a control device and comprising:
   acquiring centroid state data respectively corresponding to a spatial path start point and a spatial path end point of a motion path of a legged robot;
   determining a target landing point of a foot of the legged robot in the motion path based on the spatial path start point and the spatial path end point;
   determining a change relationship between a centroid position change coefficient and a foot contact force based on the centroid state data respectively corresponding to the spatial path start point and the spatial path end point;
   selecting, under constraint of a constraint condition set, a target centroid position change coefficient that meets the change relationship, wherein the constraint condition set comprises at least a spatial landing point constraint condition, and the spatial landing point constraint condition constrains a value of the centroid position change coefficient for the legged robot to reach the target landing point;
   determining a target motion control parameter according to the target centroid position change coefficient and the target landing point of the foot; and
   controlling, based on the target motion control parameter, the legged robot to perform motion according to the motion path.

2. The method according to claim 1, wherein the centroid state data corresponding to the spatial path start point comprises a start centroid position of the spatial path start point, and the determining a change relationship between a centroid position change coefficient and a foot contact force based on the centroid state data respectively corresponding to the spatial path start point and the spatial path end point comprises:
   obtaining moving duration required by the legged robot to complete the motion path;
   determining a plurality of sampling moments from the moving duration, and determining a time interval between each sampling moment and a moment corresponding to the spatial path start point as a time interval corresponding to the sampling moment; and
   obtaining a change relationship between the centroid position change coefficient and a foot contact force at each sampling moment according to a time interval corresponding to each sampling moment, the start centroid position, and a relational expression between a centroid position and the foot contact force at each sampling moment.

3. The method according to claim 2, wherein the obtaining a change relationship between the centroid position change coefficient and a foot contact force at each sampling moment according to a time interval corresponding to each sampling moment, the start centroid position, and a relational expression between a centroid position and the foot contact force at each sampling moment comprises:
   determining a centroid angular momentum at each sampling moment according to a body posture of the legged robot at each sampling moment; and
   obtaining the change relationship between the centroid position change coefficient and the foot contact force at each sampling moment according to the centroid angular momentum at each sampling moment, the time interval corresponding to each sampling moment, the start centroid position, and the relational expression between the centroid position and the foot contact force at each sampling moment.

4. The method according to claim 2, wherein the selecting, under constraint of a constraint condition set, a target centroid position change coefficient that meets the change relationship comprises:
   determining a target constraint relationship of a centroid position change coefficient at each sampling moment as a target constraint relationship corresponding to each sampling moment according to a foot in contact with a contact surface at each sampling moment, a body posture of the legged robot at each sampling moment, a target landing point of each foot, and the spatial landing point constraint condition; and selecting the target centroid position change coefficient that meets the target constraint relationship corresponding to each sampling moment and the change relationship between the centroid position change coefficient and the foot contact force at each sampling moment.

5. The method according to claim 4, wherein the method further comprises:

determining, for each sampling moment according to a rotation range and a length of a joint associated with a foot in contact with the contact surface at the sampling moment, a plurality of positions accessible to the foot in contact with the contact surface; and fitting the plurality of positions to obtain the spatial landing point constraint condition of the legged robot.

6. The method according to claim 1, wherein the selecting, under constraint of a constraint condition set, a target centroid position change coefficient that meets the change relationship comprises:

obtaining, under constraint of the constraint condition set, a plurality of groups of candidate results that meet the change relationship; each group of candidate results comprising a centroid position change coefficient; and minimizing an objective function according to the plurality of groups of candidate results, and determining a target result from the plurality of groups of candidate results; the objective function being a quadratic term constructed according to a correlation quantity of the candidate result.

7. The method according to claim 6, wherein the objective function comprises at least one of:

a quadratic term related to a change amount of a foot contact force in the motion path;

a quadratic term of a change amount of a centroid position in the motion path;

a quadratic term of a difference between an end centroid position of the spatial path end point in the centroid state data corresponding to the spatial path end point and a centroid position of the spatial path end point in the candidate result;

a quadratic term of a difference between an end centroid speed of the spatial path end point in the centroid state data corresponding to the spatial path end point and a centroid speed of the spatial path end point in the candidate result; or a quadratic term of a difference between an end centroid acceleration of the spatial path end point in the centroid state data corresponding to the spatial path end point and a centroid acceleration of the spatial path end point in the candidate result.

8. The method according to claim 1, wherein the constraint condition set further comprises:

a friction constraint condition used for constraining a friction between a foot of a landing point and the contact surface; and the friction between the foot of the landing point and the contact surface is determined according to the foot contact force and a friction coefficient.

9. The method according to claim 1, wherein the determining a target landing point of the foot in the motion path based on the spatial path start point and the spatial path end point comprises:

collecting a three-dimensional point cloud map of an environment in which the legged robot is currently located; and determining, from the three-dimensional point cloud map according to a foot of the legged robot in contact with the contact surface in the motion path, a target landing point corresponding to the foot in contact with the contact surface.

10. The method according to claim 1, wherein the determining a target motion control parameter according to the target centroid position change coefficient and the target landing point of each foot comprises:

determining a centroid position of the legged robot at a moment according to the target centroid position change coefficient; and determining a joint torque of the legged robot at the moment according to the centroid position of the legged robot at the moment and the target landing point of each foot.

11. A legged robot motion control apparatus, comprising:
a memory; and
at least one processor connected to the memory;
the memory storing instructions executable by the at least one processor, and the at least one processor, when executing the instructions stored in the memory, are configured to implement:

acquiring centroid state data respectively corresponding to a spatial path start point and a spatial path end point of a motion path of a legged robot;

determining a target landing point of a foot of the legged robot in the motion path based on the spatial path start point and the spatial path end point;

determining a change relationship between a centroid position change coefficient and a foot contact force based on the centroid state data respectively corresponding to the spatial path start point and the spatial path end point;

selecting, under constraint of a constraint condition set, a target centroid position change coefficient that meets the change relationship, wherein the constraint condition set comprises at least a spatial landing point constraint condition, and the spatial landing point constraint condition constrains a value of the centroid position change coefficient for the legged robot to reach the target landing point;

determining a target motion control parameter according to the target centroid position change coefficient and the target landing point of the foot; and controlling, based on the target motion control parameter, the legged robot to perform motion according to the motion path.

12. The apparatus according to claim 11, wherein the centroid state data corresponding to the spatial path start point comprises a start centroid position of the spatial path start point, and the determining a change relationship between a centroid position change coefficient and a foot contact force based on the centroid state data respectively corresponding to the spatial path start point and the spatial path end point comprises:

obtaining moving duration required by the legged robot to complete the motion path;

determining a plurality of sampling moments from the moving duration, and determining a time interval between each sampling moment and a moment corresponding to the spatial path start point as a time interval corresponding to the sampling moment; and obtaining a change relationship between the centroid position change coefficient and a foot contact force at each sampling moment according to a time interval corresponding to each sampling moment, the start centroid position, and a relational expression between a centroid position and the foot contact force at each sampling moment.

13. The apparatus according to claim 12, wherein the obtaining a change relationship between the centroid position change coefficient and a foot contact force at each sampling moment according to a time interval corresponding to each sampling moment, the start centroid position, and a relational expression between a centroid position and the foot contact force at each sampling moment comprises:
  determining a centroid angular momentum at each sampling moment according to a body posture of the legged robot at each sampling moment; and
  obtaining the change relationship between the centroid position change coefficient and the foot contact force at each sampling moment according to the centroid angular momentum at each sampling moment, the time interval corresponding to each sampling moment, the start centroid position, and the relational expression between the centroid position and the foot contact force at each sampling moment.

14. The apparatus according to claim 12, wherein the selecting, under constraint of a constraint condition set, a target centroid position change coefficient that meets the change relationship comprises:
  determining a target constraint relationship of a centroid position change coefficient at each sampling moment as a target constraint relationship corresponding to each sampling moment according to a foot in contact with a contact surface at each sampling moment, a body posture of the legged robot at each sampling moment, a target landing point of each foot, and the spatial landing point constraint condition; and
  selecting the target centroid position change coefficient that meets the target constraint relationship corresponding to each sampling moment and the change relationship between the centroid position change coefficient and the foot contact force at each sampling moment.

15. The apparatus according to claim 14, wherein the processor is further configured to perform:
  determining, for each sampling moment according to a rotation range and a length of a joint associated with a foot in contact with the contact surface at the sampling moment, a plurality of positions accessible to the foot in contact with the contact surface; and
  fitting the plurality of positions to obtain the spatial landing point constraint condition of the legged robot.

16. The apparatus according to claim 11, wherein the selecting, under constraint of a constraint condition set, a target centroid position change coefficient that meets the change relationship comprises:
  obtaining, under constraint of the constraint condition set, a plurality of groups of candidate results that meet the change relationship; each group of candidate results comprising a centroid position change coefficient; and
  minimizing an objective function according to the plurality of groups of candidate results, and determining a target result from the plurality of groups of candidate results; the objective function being a quadratic term constructed according to a correlation quantity of the candidate result.

17. The apparatus according to claim 16, wherein the objective function comprises at least one of:

a quadratic term related to a change amount of a foot contact force in the motion path;
  a quadratic term of a change amount of a centroid position in the motion path;
  a quadratic term of a difference between an end centroid position of the spatial path end point in the centroid state data corresponding to the spatial path end point and a centroid position of the spatial path end point in the candidate result;
  a quadratic term of a difference between an end centroid speed of the spatial path end point in the centroid state data corresponding to the spatial path end point and a centroid speed of the spatial path end point in the candidate result; or
  a quadratic term of a difference between an end centroid acceleration of the spatial path end point in the centroid state data corresponding to the spatial path end point and a centroid acceleration of the spatial path end point in the candidate result.

18. The apparatus according to claim 11, wherein the constraint condition set further comprises:
  a friction constraint condition used for constraining a friction between a foot of a landing point and the contact surface; and the friction between the foot of the landing point and the contact surface is determined according to the foot contact force and a friction coefficient.

19. The apparatus according to claim 11, wherein the determining a target landing point of the foot in the motion path based on the spatial path start point and the spatial path end point comprises:
  collecting a three-dimensional point cloud map of an environment in which the legged robot is currently located; and
  determining, from the three-dimensional point cloud map according to a foot of the legged robot in contact with the contact surface in the motion path, a target landing point corresponding to the foot in contact with the contact surface.

20. A non-transitory storage medium, storing computer instructions, when run on a computer, causing the computer to perform:
  acquiring centroid state data respectively corresponding to a spatial path start point and a spatial path end point of a motion path of a legged robot;
  determining a target landing point of a foot of the legged robot in the motion path based on the spatial path start point and the spatial path end point;
  determining a change relationship between a centroid position change coefficient and a foot contact force based on the centroid state data respectively corresponding to the spatial path start point and the spatial path end point;
  selecting, under constraint of a constraint condition set, a target centroid position change coefficient that meets the change relationship, wherein the constraint condition set comprises at least a spatial landing point constraint condition, and the spatial landing point constraint condition constrains a value of the centroid position change coefficient for the legged robot to reach the target landing point;
  determining a target motion control parameter according to the target centroid position change coefficient and the target landing point of the foot; and controlling, based on the target motion control parameter, the legged robot to perform motion according to the motion path.

\* \* \* \* \*